(12) United States Patent
Kardos et al.

(10) Patent No.: US 8,584,457 B2
(45) Date of Patent: Nov. 19, 2013

(54) COOLER ARRANGEMENT FOR A VEHICLE POWERED BY A SUPERCHARGED COMBUSTION ENGINE

(75) Inventors: Zoltan Kardos, Södertälje (SE); Kristoffer Klingberg, Huddinge (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 13/699,319

(22) PCT Filed: May 11, 2011

(86) PCT No.: PCT/SE2011/050593
§ 371 (c)(1),
(2), (4) Date: Nov. 21, 2012

(87) PCT Pub. No.: WO2011/149409
PCT Pub. Date: Dec. 1, 2011

(65) Prior Publication Data
US 2013/0068202 A1    Mar. 21, 2013

(30) Foreign Application Priority Data
May 25, 2010    (SE) ...................................... 1050516

(51) Int. Cl.
*F02B 29/04*    (2006.01)
*F01K 23/10*    (2006.01)
*F01P 1/06*    (2006.01)

(52) U.S. Cl.
USPC ............................. 60/599; 60/618; 123/41.31

(58) Field of Classification Search
USPC ............... 60/599, 618, 605.2; 123/563, 41.31
See application file for complete search history.

(56) References Cited

U.S. PATENT DOCUMENTS

| 3,888,084 | A | * | 6/1975 | Hawkins | ......................... 60/614 |
| 7,874,154 | B2 | * | 1/2011 | Raab et al. | ..................... 60/599 |
| 8,028,522 | B2 | * | 10/2011 | Irmler et al. | .................... 60/599 |
| 8,434,307 | B2 | * | 5/2013 | Ambros et al. | ................. 60/618 |

(Continued)

FOREIGN PATENT DOCUMENTS

| DE | 198 54 544 A1 | 6/2000 |
| DE | 10 2007 052 117 A1 | 5/2009 |
| GB | 2 453 218 A | 4/2009 |

OTHER PUBLICATIONS

International Search Report mailed Sep. 1, 2011 in corresponding PCT International Application No. PCT/SE2011/050593.

*Primary Examiner* — Thai Ba Trieu
*Assistant Examiner* — Ngoc T Nguyen
(74) *Attorney, Agent, or Firm* — Ostrolenk Faber LLP

(57) ABSTRACT

A cooler arrangement for a vehicle which is powered by a supercharged combustion engine. The vehicle has at least one charge air cooler (10) for cooling of compressed air which is led to the combustion engine (2), and an energy recovery system. The vehicle also has a cooler arrangement of a first cooling circuit with a first cooler (20) for cooling a circulating coolant, a second cooling circuit with a second cooler (26) for cooling a circulating coolant to a lower temperature than the first cooler (20), and a third cooling circuit with a third cooler (29) for cooling a circulating coolant to a lower temperature than the second cooler (26). The coolant in the third cooling circuit cools the compressed air in the charge air cooler (10) and/or a medium in a condenser (45) in a cooling medium line (32).

10 Claims, 3 Drawing Sheets

(56) References Cited

U.S. PATENT DOCUMENTS

| | | | |
|---|---|---|---|
| 2008/0264609 A1* | 10/2008 | Lutz et al. | 165/104.19 |
| 2009/0020079 A1* | 1/2009 | Muller et al. | 123/41.1 |
| 2009/0211253 A1 | 8/2009 | Radcliff et al. | 60/670 |
| 2010/0012054 A1 | 1/2010 | Justin et al. | 123/41.1 |
| 2011/0198070 A1* | 8/2011 | Riccardo et al. | 165/287 |
| 2011/0214627 A1* | 9/2011 | Nishikawa et al. | 123/41.02 |

* cited by examiner

COOLER ARRANGEMENT FOR A VEHICLE POWERED BY A SUPERCHARGED COMBUSTION ENGINE

CROSS-REFERENCE TO RELATED APPLICATIONS

The present application is a 35 U.S.C. §§371 national phase conversion of PCT/SE2011/050593, filed May 11, 2011, which claims priority of Swedish Application No. 1050516-2, filed May 25, 2010, the contents of which are incorporated by reference herein. The PCT International Application was published in the English language.

BACKGROUND TO THE INVENTION AND PRIOR ART

The present invention relates to a cooler arrangement for a vehicle which is powered by a supercharged combustion engine.

The development of the performance of combustion engines and the requirement for ever lower emissions in their exhaust gases have resulted in ever increasing cooling requirements in vehicles. The air which is led to a combustion engine is compressed to high pressure before it is led to the engine. Compressing the air causes it to acquire a raised temperature which is related to the degree of compression. To reduce the volume of the compressed air, it is cooled in one or more charge air coolers before it is led to the engine. The technique called EGR (exhaust gas recirculation) is a known way of leading back part of the exhaust gases of a combustion engine. Adding exhaust gases to the air causes a lower combustion temperature resulting inter alia in a reduced content of nitrogen oxides $NO_x$ in the exhaust gases. The exhaust gases from a combustion engine may be at a high temperature. To reduce the volume of the recirculating exhaust gases, they are cooled in one or more EGR coolers before being mixed with the air and led to the engine. Effective cooling of the compressed air and the recirculating exhaust gases makes it possible for a large amount of air and exhaust gases to be led to the engine. The performance of a combustion engine increases with the amount of air and recirculating exhaust gases supplied.

US 2009/0211253 refers to an energy recovery arrangement whereby a circulating medium absorbs thermal energy from a plurality of heat exchangers in the form of, inter alia, a charge air cooler and an EGR cooler. The medium is warmed by the thermal energy absorbed to a temperature at which it vaporises. The vaporised medium has not only a raised temperature but also a raised pressure. The medium is then led through a turbine. Part of the thermal energy absorbed is converted in the turbine to mechanical energy. The medium is led thereafter to a condenser in which it is cooled by a cooling air flow to a temperature at which it condenses. The resulting liquid medium is circulated from the condenser back to said coolers in order to again absorb thermal energy so that it becomes vaporised.

SUMMARY OF THE INVENTION

The object of the present invention is to reduce the fuel consumption of a vehicle which is powered by a supercharged combustion engine.

This object is achieved with the cooler arrangement of the invention. The amount of air led into a combustion engine is related to the engine's performance and fuel consumption. In this case a cooler arrangement is used which comprises three cooling circuits with coolant at different temperatures. The third cooling circuit, which has coolant at the lowest temperature, may here be used to cool the compressed air in a charge air cooler. The compressed air may thus be cooled to a very low temperature before it is led to the combustion engine. Such cooling makes it possible for a large amount of air to be led to the combustion engine, resulting in low fuel consumption. To further reduce its fuel consumption, the vehicle has an energy recovery system containing a phase-transforming medium which absorbs thermal energy from suitable heat sources close to the combustion engine. Normally this thermal energy is not utilised but is released to the surroundings. The medium, which may be water, has the characteristic that it vaporises at a lower temperature than the temperature of at least one of said heat sources. The vaporised medium thus acquires a raised pressure and a raised temperature. The vaporised medium is led to a turbine which converts part of the medium's thermal energy to mechanical energy. The medium is thereafter cooled in a condenser to a temperature at which it reverts to liquid form. In this case, coolant in the third cooling circuit may be used to cool the medium in a condenser. The medium may thus be cooled to a temperature close to the temperature of the coolant in the third cooling circuit. The lower the temperature to which the medium is cooled in the condenser, the more thermal energy the energy recovery system can absorb from said heat sources and convert to mechanical energy. In cases where the compressed air or the medium undergoes several steps of cooling, it is advantageous to use the coolant in the third cooling circuit to subject the compressed air and/or the medium to a final step of cooling. In cases where the coolant in the third cooling circuit is not used to cool both the compressed air and said medium, the coolant in the second cooling circuit may be used to cool the air or the medium which is not cooled by the coolant in the third cooling circuit.

According to a preferred embodiment of the invention, the first cooler, the second cooler and the third cooler are situated in a region of the vehicle where a substantially common cooling air flow passes through them and they are so arranged that the second cooler is situated upstream of the first cooler and the third cooler is situated upstream of the second cooler with respect to the intended direction of air flow through the coolers. The air led through said coolers thus acquires progressively rising temperature as it cools the coolants in the respective coolers. As the temperature of the cooling air is lowest when it reaches the third cooler, the coolant in the third cooler will be cooled to the lowest temperature. Since the air reaching the second cooler is at a lower temperature than the air reaching the first cooler, the coolant in the second cooler acquires a lower temperature than the coolant in the first cooler. The third cooler is with advantage so located in the vehicle that it has air at the temperature of the surroundings flowing through it. The coolant in the third cooler may thus be cooled to a temperature close to the temperature of the surroundings. Consequently, the compressed air and/or the phase-converting medium may also be cooled by the coolant in the third cooler to a temperature close to the temperature of the surroundings.

According to an embodiment of the present invention, the first cooling circuit, the second cooling circuit and the third cooling circuit form part of a common cooling system. In this case a coolant pump can circulate the same coolant through all three circuits. The configuration of this common cooling system may preferably be such that the coolant in the third cooling circuit has undergone three steps of cooling before it is used for cooling the compressed air and/or the medium. In this case, the coolant is first cooled in the first cooler, thereafter in the second cooler and finally in the third cooler. The coolant in the third cooling circuit may thus acquire effective cooling to a low temperature. Alternatively, the first cooling circuit may constitute a separate cooling system and the second cooling circuit and the third cooling circuit may jointly constitute another cooling system. In this case a coolant pump circulates coolant in the first cooling circuit. Another coolant pump circulates coolant in the cooling system which comprises the second cooling circuit and the third cooling circuit. According to a further alternative, the first cooling circuit, the second cooling circuit and the third cooling circuit constitute three separate cooling systems. In this case a coolant pump is required in each of the three separate cooling systems.

According to an embodiment of the present invention, the energy recovery system comprises two condensers and the coolant in the second cooling circuit is used to cool the medium in a first condenser and the coolant in the third cooling circuit is used to cool the medium in a second condenser which is situated downstream of the first condenser. The cooling of the medium is important for achieving good absorption of thermal energy in the heat recovery system. It may therefore be necessary to subject the medium to two steps of cooling in two separate condensers. In this case it is advantageous to use the coolant in the second cooling circuit to subject the medium to a first step of cooling and the coolant in the third cooling circuit to subject the medium to a second step of cooling. The energy-absorbing system comprises with advantage at least one heat exchanger in which the medium is intended to absorb thermal energy from a heat source in the form of warm coolant, compressed air, exhaust gases in the exhaust line or recirculating exhaust gases. All of these heat sources contain surplus heat which can be utilised in the energy recovery system. The coolant, the compressed air and the recirculating exhaust gases are normally cooled in at least one cooler to lower their temperature, in which case the heat exchanger may replace or complement such an ordinary cooler.

According to an embodiment of the present invention, the vehicle comprises a return line for recirculation of exhaust gases and the recirculating exhaust gases are cooled in an EGR cooler by coolant from the third cooling circuit or by the medium after it has been cooled by the coolant in the third cooling circuit in the condenser. In cases where exhaust gases are added to the compressed air which is led to the combustion engine, it is advantageous to cool the recirculating exhaust gases to the same low temperature as the compressed air. It is therefore appropriate to use the coolant in the third cooling circuit for this purpose. Alternatively, the medium may be used to similar effect after it has been cooled by the coolant in the third cooling circuit. The first cooling circuit contains with advantage coolant which is used for cooling the combustion engine. The operating temperature of this coolant should normally be about 70-90° C. to cool the combustion engine to a suitable temperature. The coolant in the first cooling circuit, the second cooling circuit and the third cooling circuit may of course be used to meet other cooling requirements in the vehicle. Since the coolant will be at different temperatures in the three cooling circuits, the coolant which is at the most suitable temperature may be used in each case.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
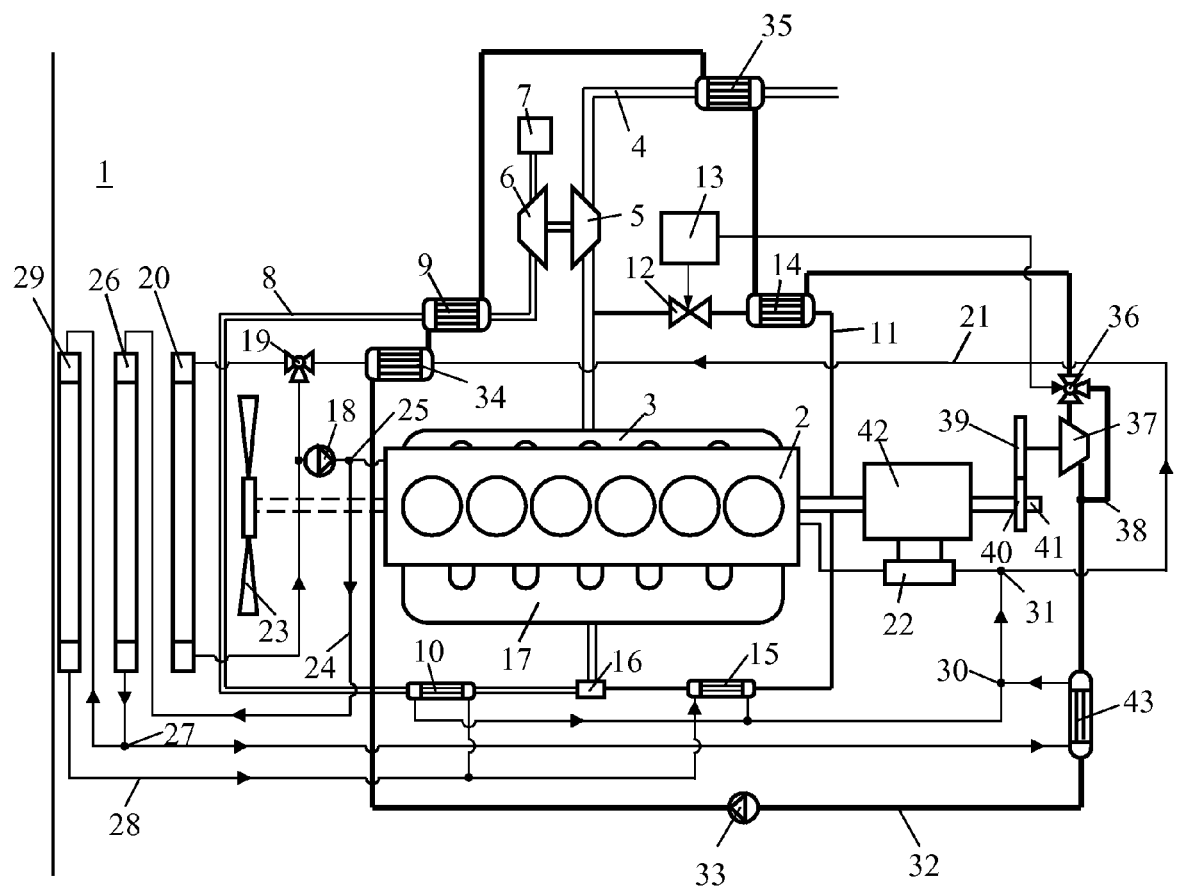
FIG. 1 depicts a cooler arrangement for a supercharged combustion engine according to a first embodiment of the invention and FIG. 2 depicts a cooler arrangement for a supercharged combustion engine according to a second embodiment of the invention and FIG. 3 depicts a cooler arrangement for a supercharged combustion engine according to a third embodiment of the invention.

FIG. 1 depicts a supercharged combustion engine adapted to powering a schematically depicted vehicle 1 which may be a heavy vehicle 1. The combustion engine 2 is here exemplified as a diesel engine 2. The exhaust gases from the cylinders of the diesel engine 2 are led to an exhaust line 4 via an exhaust manifold 3. The diesel engine 2 is provided with a first turbo unit which comprises a turbine 5 and a compressor 6. The exhaust gases in the exhaust line 4 expand through the turbine 5, which is thus provided with driving power which is transmitted, via a connection, to the compressor 6. The arrangement comprises an inlet line 8 adapted to leading air to the combustion engine 2. The compressor 6 of the first turbo unit compresses air which is drawn into an inlet line 8 via an air filter 7. In the inlet line 8, the air undergoes a first step of cooling in a first charge air cooler 9 and a second step of cooling in a second charge air cooler 10.

The arrangement comprises a return line 11 for recirculation of exhaust gases from the exhaust line 4. The return line 11 has an extent between the exhaust line 4 and the inlet line 8. The return line 11 comprises an EGR valve 12 by which the exhaust flow in the return line 11 can be shut off. The EGR valve 12 may also be used to steplessly control the amount of exhaust gases led from the exhaust line 4 to the inlet line 8 via the return line 11. A control unit 13 is adapted to controlling the EGR valve 12 on the basis of information about the current operating state of the diesel engine 2. The return line 11 comprises a first EGR cooler 14 for subjecting the recirculating exhaust gases to a first step of cooling, and a second EGR cooler 15 for subjecting the exhaust gases to a second step of cooling. The compressed air and the recirculating exhaust gases are mixed in a portion 16 before they are led to the respective cylinders of the diesel engine 2 via a manifold 17.

The vehicle 1 is in this case provided with a cooler arrangement in the form of three cooling circuits containing coolant at different temperatures. The coolant is circulated in the cooler arrangement by a coolant pump 18. The configuration of a first cooling circuit of the cooler arrangement corresponds substantially to a conventional cooling system for cooling a combustion engine 2. The first cooling circuit comprises a line system 21 which leads coolant through the combustion engine 2. After it has cooled the combustion engine 2, the coolant is led to a further cooler which may be an oil cooler 22 for a retarder. After it has cooled the oil in the oil cooler 22, the coolant is led to a thermostat 19. The thermostat 19 directs the coolant to the combustion engine 2 in situations where it has not reached a necessary operating temperature, or to a first cooler 20 for cooling when it needs cooling. The first cooler 20 is situated close to a forward portion of the vehicle 1. A radiator fan 23 forces a cooling air flow through the first cooler 20. After being cooled in the first cooler 20, the coolant is led back to the combustion engine 2.

A second cooling circuit of the cooler arrangement comprises a second line system 24. The line system 24 receives part of the coolant from the first line system 21 at a location 25 situated immediately downstream of the coolant pump 18. Coolant has undergone a first step of cooling in the first cooler 20 when it reaches the location 25. The coolant in the second cooling circuit is led in the line system 24 to a second cooler 26 in which it undergoes a second step of cooling. The second cooler 26 is situated upstream of the first cooler 20 with respect to the direction of cooling air flow through the coolers 20, 26. This means that the coolant in the second cooler 26 is cooled by air which is at a lower temperature than the air which flows through the first cooler 20. The coolant in the second cooler 26 thus acquires a lower temperature than the coolant which is cooled in the first cooler 20. The second cooling circuit comprises at a location 27 a connection to the third cooling circuit.

The third cooling circuit of the cooler arrangement comprises a line system 28 which receives part of the coolant from the second cooling circuit at a location 27. This coolant has therefore undergone a first step of cooling in the first cooler 20 and a second step of cooling in the second cooler 26. The coolant is led in the line system 28 to a third cooler 29 situated upstream of the second cooler 26 and the first cooler 20 with respect to the direction of air flow through the coolers 20, 26, 29. This means that the coolant in the third cooler 29 undergoes a third step of cooling by air at a lower temperature than the air which flows through the second cooler 26. The coolant leaving the third cooler 29 is therefore at a lower temperature than the coolant leaving the second cooler 26. The third cooler 29 is situated at a location in the vehicle 1 where it is in contact with air at the temperature of the surroundings. The coolant in the third cooler 29 may therefore be cooled to a temperature close to the temperature of the surroundings. The coolant in the third cooling circuit is led back to the second cooling circuit at a location 30. Coolant from the second cooling circuit is thereafter led back to the first cooling circuit at a location 31.

The combustion engine 2 is provided with an energy recovery system. The energy recovery system comprises a line circuit 32 with a circulating medium which has a suitable vaporisation temperature. The medium is with advantage water. The medium is circulated in the circuit 32 by a pump 33. The medium is led in liquid form by the pump 33 to a first heat exchanger 34. The medium is warmed in the first heat exchanger 34 by the coolant in the first cooling circuit. The coolant may here be at a temperature of up to about 100° C. The medium is thereafter led to a second heat exchanger which here takes the form of a first charge air cooler 9. The compressed air may be at a temperature of up to about 200° C. The medium may be wholly or partly vaporised in the charge air cooler 9 when it is heated by the compressed air. The medium is then led to a third heat exchanger 35 in which it is heated by the exhaust gases in the exhaust line 4. The exhaust gases which have here expanded through the turbine 5 may be at a temperature of up to about 350° C. The medium, which is now in a wholly vaporised state, is warmed finally in a fourth heat exchanger in the form of the first EGR cooler 14. The recirculating exhaust gases may be at a temperature of up to about 650° C. The medium undergoes in the first EGR cooler 14 a fourth step of warming to a relatively high temperature and a relatively high pressure.

The line circuit 32 comprises downstream of the fourth heat exchanger 14 a valve 36 which can direct the medium to a turbine 37 or to a bypass line 38. The vaporised medium is normally led to the turbine 37, in which it expands. The turbine 37 thereby acquires rotary motion which is transmitted, via a mechanical transmission 39, to the flywheel 40 on an output shaft 41 from a gearbox 42 which is connected to the combustion engine 2. The output shaft 41 thereby acquires extra driving power to propel the vehicle 1. The mechanical transmission 39 may comprise a suitable number of motion-transmitting elements in the form of spur gears or the like so that the motion from the turbine 37 undergoes a suitable downshift before it is transmitted to the flywheel 40. The bypass line 38 has a first end connected to the line circuit 32 at a location upstream of the turbine 37 and a second end connected to the line circuit 32 at a location downstream of the turbine 37 with respect to the direction of flow of the medium in the line circuit 32. The valve 36 may thus be placed in a first position whereby it leads the vaporised medium to the turbine 37 and in a second position whereby it leads the medium through the bypass line 38 and consequently past the turbine 37. The medium may be led through the bypass line 38 in situations, for example, where the medium has not been completely vaporised or where the vehicle does not require any extra driving force.

After the vaporised medium has passed through the turbine 37 or the bypass line 38, it is led to a condenser 43. The medium is cooled in the condenser 43 by coolant in the second cooling circuit to a temperature at which it condenses. The coolant in the second cooling circuit will thus be at a lower temperature than the coolant in the first cooling circuit. The medium is therefore cooled in the condenser 43 to a relatively low temperature before it is again used to absorb thermal energy in the heat exchangers 34, 9, 35, 14. Said line circuit 32 makes it possible for thermal energy from coolant in the first cooling circuit, the charge air, exhaust gases in the exhaust line and the recirculating exhaust gases to be utilised and converted to mechanical energy to power the vehicle 1. The combustion engine 2 thus acquires greater capacity and efficiency without being supplied with extra fuel. The cooling action of the medium in the line circuit 32 upon charge air in the second cooler 9, recirculating exhaust gases in EGR cooler 14 and coolant in the heat exchanger 34 reduces the load on the ordinary coolers 10, 15, 20 in their task of cooling these media. The dimensions of the ordinary coolers 10, 15, 20 may therefore be smaller.

During operation of the diesel engine 2, exhaust gases flow through the exhaust line 4. The exhaust gases drive the turbines 5 of the turbo unit. The turbines 5 are thus provided with driving power which drives the compressor 6 of the turbo unit. The compressor 6 draws in and compresses surrounding air in the inlet line 8. Compressing the air raises its pressure and temperature. The compressed air undergoes a first step of cooling in the first charge air cooler 9 by the medium circulating in the line circuit 32 and a second step of cooling in the second charge air cooler 10 by coolant circulating in the third cooling circuit. The coolant in the third cooling circuit has, after the cooling in the third cooler 29, a temperature substantially corresponding to that of the surroundings. This means that the compressed air can likewise be cooled to a temperature close to that of the surroundings in the second charge air cooler 10.

In most operating states of the diesel engine 2, the control unit 13 keeps the EGR valve 12 open so that part of the exhaust gases in the exhaust line 4 is led into the return line 11. The recirculating exhaust gases undergo in the first EGR cooler 14 a first step of cooling by the medium circulating in the line circuit 32. The recirculating exhaust gases are thereafter led to the second EGR cooler 15 in which they are cooled by coolant from the third cooling circuit. With a suitably dimensioned second EGR cooler 15, the recirculating exhaust gases may be cooled to a temperature close to the temperature of the surroundings. Exhaust gases in the return line 11 may therefore undergo cooling to substantially as low a temperature as the compressed air before they are mixed. This means that a substantially optimum amount of compressed air and recirculating exhaust gases can be led into the combustion engine 2 at a high pressure, resulting in the possibility of combustion in the engine 2 with high performance and optimum reduction of the nitrogen oxides in the exhaust gases.

The embodiment in FIG. 1 thus uses a first cooling circuit, a second cooling circuit and a third cooling circuit which form part of a common cooling system with a common coolant. Coolant is circulated in the common cooling system by a coolant pump 18. The coolant may undergo in the common cooling system one, two or three steps of cooling before it is used for cooling. The coolant in the first cooling circuit is cooled in the first cooler 20 before it is used to cool the combustion engine 2 and oil in the oil cooler 22. The coolant received in the second cooling circuit has undergone a first step of cooling in the first cooler 20. The coolant then undergoes a second step of cooling in the second cooler 26 before it is used to cool the circulating medium in the condenser 43. The coolant received in the third cooling circuit has already undergone steps of cooling in the first cooler 20 and the second cooler 26. The coolant thereafter undergoes a third step of cooling in the third cooler 29 by air at the temperature of the surroundings before it is used to cool the compressed air in the second charge air cooler 10 and the recirculating exhaust gases in the second EGR cooler 15.

Figure 2:
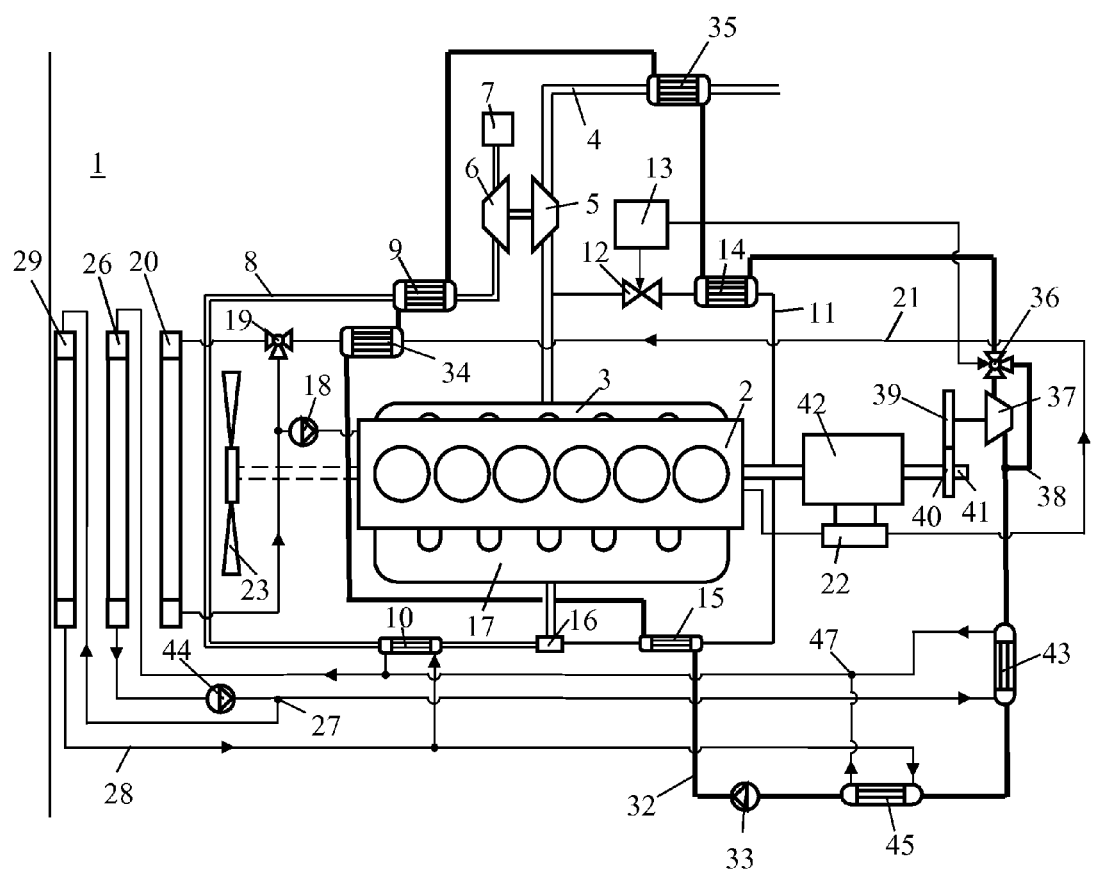

FIG. 2 depicts an alternative embodiment of the cooler arrangement. In this case the first cooling circuit constitutes a separate cooling system. This separate cooling system corresponds substantially to a conventional cooling system for cooling a combustion engine 2. The coolant is circulated in the first cooling circuit by a coolant pump 18. The coolant in the cooling system cools not only the combustion engine but also oil in an oil cooler 22. The coolant in the first cooling circuit is cooled in a heat exchanger 34 by the circulating medium and in a first cooler 20. The second cooling circuit and the third cooling circuit here constitute a joint cooling system with a circulating coolant. A coolant pump 44 circulates coolant in the joint cooling system. After coolant has been cooled in the second cooler 26, it is led in the second line system 24 to a first condenser 43 in which it subjects to a first step of cooling the medium circulating in the energy-absorbing system. The coolant is thereafter led back to the second cooler 26 for renewed cooling.

The third cooling circuit comprises a line system 28 which receives part of the coolant from the second cooler at a location 27. The coolant received at this location has therefore already been cooled in the second cooler 26. The coolant is led in the line system 28 to the third cooler 29 which is situated upstream of the second cooler 26 with respect to the direction of air flow through the coolers 26, 29. This means that the coolant is cooled in the third cooler 29 by air which is at a lower temperature than the air which flows through the second cooler 26. The coolant leaving the third cooler 29 is thus at a lower temperature than coolant leaving the second cooler 26. Coolant in the third cooling circuit is led to a second condenser 45 in which it subjects to a second step of cooling the medium circulating in the energy-absorbing system. The coolant is thereafter led back to the line system 24 of the second cooling circuit at a location 47 and the second cooler 26 in order to be cooled.

The medium in the energy recovery system undergoes in this case a first step of cooling in a first condenser 43 by coolant in the second cooling circuit and a second step of cooling in a second condenser 45 by coolant in the third cooling circuit. The circulating medium may thus be cooled to a temperature close to the temperature of the surroundings. Such effective cooling of the medium circulating in the energy recovery system enables it to absorb a relatively large amount of thermal energy which can be recovered in the turbine 37. In this case the medium in the energy recovery system is used to cool the recirculating exhaust gases in the second EGR cooler 15.

Figure 3:
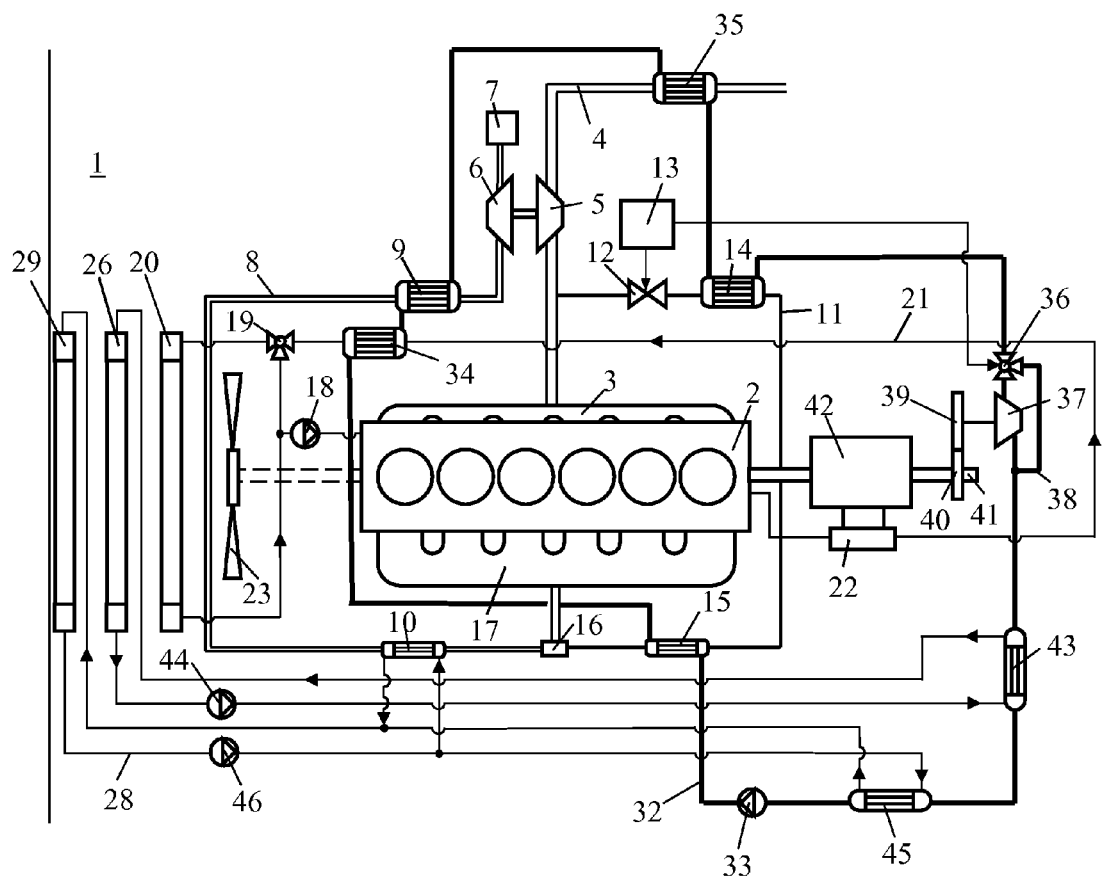

FIG. 3 depicts a further alternative embodiment of the cooler arrangement. In this case the first cooling circuit, the second cooling circuit and the third cooling circuit constitute separate cooling systems. A coolant pump 18 circulates the coolant in the first cooling circuit. This cooling circuit corresponds entirely to the cooling circuit in FIG. 2. A coolant pump 44 circulates the coolant in the second cooling circuit. The coolant in the second cooling circuit cools the compressed air in the second EGR cooler 10 and the medium in the first condenser 43. The coolant is thereafter cooled in the second cooler 26. A coolant pump 46 circulates the coolant in the third cooling circuit. The coolant in the third cooling circuit cools the compressed air in the second EGR cooler 10 and the medium in the second condenser 45. The coolant is thereafter cooled in the third cooler 29.

The invention is in no way limited to the embodiment to which the drawing refers but may be varied freely within the scopes of the claims.

The invention claimed is:

1. A cooler arrangement for a vehicle which is powered by a supercharged combustion engine, the arrangement comprises:
    an inlet line leading compressed air to the combustion engine;
    a first charge air cooler and a second charge air cooler located at the inlet line and configured for cooling the compressed air before it is led into the combustion engine; and
    an energy recovery system comprising a line circuit with a circulating medium, therein, at least one heat exchanger at the line circuit such that the circulating medium absorbs heat at the heat exchanger so that the medium becomes vaporized, a turbine at the line circuit in which the vaporized medium is expanded;
    at least one condenser located after the turbine in the line circuit and in which the medium is cooled to a temperature at which it condenses;
    a first cooling circuit with a first cooler located and configured to cool a circulating coolant in the first cooling circuit,
    a second cooling circuit with a second cooler located and configured to cool a circulating coolant in the second cooling circuit to a lower temperature than the temperature to which the coolant is cooled in the first cooler, and
    a third cooling circuit with a third cooler located and configured to cool a circulating coolant in the third cooling circuit to a lower temperature than the temperature to which the coolant is cooled in the second cooler; and
    wherein the third cooling circuit is located and configured so that coolant cooled in the third cooling circuit cools the compressed air in the second charge air cooler and the medium in the condenser and wherein the energy recovery system absorbs thermal energy from the compressed air in the first charge air cooler.

2. An arrangement according to claim 1, wherein the first cooler, the second cooler and the third cooler are situated in a region of the vehicle where a substantially common cooling air flow passes through the coolers, and the coolers are arranged so that the second cooler is situated upstream in the air flow of the first cooler and the third cooler is situated upstream in the air flow of the second cooler with respect to a direction of air flow through the coolers.

3. An arrangement according to claim 2, wherein the third cooler is located in the air flow to receive air at the temperature of the surroundings flowing through the third cooler.

4. An arrangement according to claim 1, further comprising the first cooling circuit, the second cooling circuit and the third cooling circuit constituting a common cooling system.

5. An arrangement according to claim 2, wherein the first cooling circuit constitutes a separate cooling system, and the second cooling circuit and the third cooling circuit jointly constitute another cooling system.

6. An arrangement according to claim 2, wherein the first cooling circuit, the second cooling circuit, and the third cooling circuit constitute three separate cooling systems.

7. An arrangement according to claim 2, wherein the energy recovery system comprises a first and a second condenser, the cooling circuits and the condensers are located and configured so that the coolant in the second cooling circuit cools the medium in the first condenser and the coolant in the third cooling circuit cools the medium in the second condenser, and the second condenser is situated downstream of the first condenser in the air flow.

8. An arrangement according to claim 1, wherein the energy recovery system comprises at least one heat exchanger in which the medium absorbs thermal energy from a heat source in the form of at least one of coolant, exhaust gases in the exhaust line or recirculating exhaust gases.

9. An arrangement according to claim 7, wherein the vehicle comprises a return line from the engine for recirculating exhaust gases to the engine and an EGR cooler at the return line for cooling the recirculating exhaust gases by coolant from the third cooling circuit or by the medium after the medium has been cooled by the coolant in the third cooling circuit in the second condenser at the third cooling circuit.

10. An arrangement according to claim 1, wherein the first cooling circuit contains coolant, and the first cooling circuit is located and configured for cooling the combustion engine.

* * * * *